United States Patent
Heo et al.

(10) Patent No.: US 9,974,351 B2
(45) Date of Patent: May 22, 2018

(54) SHOES INCLUDING WOOL AND METHOD OF MANUFACTURING UPPER FOR SHOES

(71) Applicant: Min-Su Heo, Siheung-si, Gyeonggi-do (KR)

(72) Inventors: Min-Su Heo, Siheung-si (KR); Kye-Soo Kim, Ansan-si (KR)

( * ) Notice: Subject to any disclaimer, the term of this patent is extended or adjusted under 35 U.S.C. 154(b) by 0 days. days.

(21) Appl. No.: 15/494,223

(22) Filed: Apr. 21, 2017

(65) Prior Publication Data

US 2018/0055136 A1 Mar. 1, 2018

(30) Foreign Application Priority Data

Aug. 31, 2016 (KR) .................. 10-2016-0111702

(51) Int. Cl.
| | |
|---|---|
| A43B 1/04 | (2006.01) |
| A43B 23/02 | (2006.01) |
| D04B 1/24 | (2006.01) |
| B29D 35/00 | (2010.01) |
| B29D 35/12 | (2010.01) |
| B29K 675/00 | (2006.01) |
| B29K 667/00 | (2006.01) |

(52) U.S. Cl.
CPC ............ *A43B 1/04* (2013.01); *A43B 23/0205* (2013.01); *A43B 23/025* (2013.01); *A43B 23/026* (2013.01); *A43B 23/028* (2013.01); *A43B 23/0255* (2013.01); *B29D 35/0054* (2013.01); *B29D 35/126* (2013.01); *D04B 1/24* (2013.01); *B29K 2667/00* (2013.01); *B29K 2675/00* (2013.01)

(58) Field of Classification Search
CPC ..... A43B 1/04; A43B 23/0205; A43B 23/022; A43B 23/025; A43B 23/0255
USPC .................... 36/55, 47, 54, 48, 45
See application file for complete search history.

(56) References Cited

U.S. PATENT DOCUMENTS

| | | | |
|---|---|---|---|
| 9,149,086 B2 | 10/2015 | Greene et al. | |
| 2014/0250727 A1 | 9/2014 | VanDernoot | |
| 2014/0310983 A1* | 10/2014 | Tamm | A43B 23/0245 36/83 |
| 2014/0310986 A1* | 10/2014 | Tamm | A43B 1/00 36/84 |
| 2016/0021980 A1 | 1/2016 | Scofield | |
| 2016/0324269 A1* | 11/2016 | Dombrow | A43C 1/04 |

FOREIGN PATENT DOCUMENTS

| | | |
|---|---|---|
| WO | 2011043998 A2 | 4/2011 |
| WO | 2012103505 A1 | 8/2012 |

* cited by examiner

*Primary Examiner* — Arti Singh-Pandey
(74) *Attorney, Agent, or Firm* — Lee & Associates, LLC

(57) ABSTRACT

Provided is a shoe including a sole and an upper, where the upper includes an inner upper and an outer upper. The inner upper includes 90% or more of a wool fiber and the outer upper includes a combination of 50 to 80% by weight of the wool fiber and 20 to 50% by weight of a synthetic fiber based on the total weight of the outer upper.

15 Claims, 3 Drawing Sheets

SHOES INCLUDING WOOL AND METHOD OF MANUFACTURING UPPER FOR SHOES

RELATED APPLICATIONS

This application claims priority to Korean Patent Application 10-2016-0111702, filed 31 Aug. 2016.

BACKGROUND OF THE INVENTION

Field of the Invention

The present invention relates to shoes including wool and a method of manufacturing uppers for shoes.

Description of the Related Art

Shoes function to protect the feet and as a fashion accessory. Recently, as standard of living rises, wellbeing boom is ubiquitous and a variety of functional shoes such as running shoes, walking shoes and hiking boots are released on the market.

Shoes should offer wearing sensation including a sense of comfort as a basic function while stably surrounding the feet in addition to the function of protecting feet. In addition, the most important characteristic for all kinds of shoes is light weight to allow a user to be unaware of wearing the shoes.

Furthermore, shoes should allow sweat secreted from the feet to be discharged outside promptly. For this purpose, among various components constituting shoes, uppers should secure functionality.

Conventional materials for most shoes were synthetic fibers used in consideration of durability, easy processing, economic efficiency and the like. When shoes are manufactured focusing on durability, the thickness of the upper is increased and the shape of the upper according to the shape of feet cannot readily changed due to hard texture, thus deteriorating wear sensation. In addition, sweat generated by the feet in ordinary life and during exercise cannot be discharged outside due to poor water absorbability and moisture permeability derived from the nature of artificial fibers, which can result in skin diseases such as athlete's foot and eczema.

SUMMARY OF THE INVENTION

Therefore, the present invention has been made in view of the above problems, and it is an object of the present invention to provide shoes including uppers made of natural wool fibers which are soft and have superior air permeability and water absorbability.

The object can be accomplished by providing shoes obtained by applying natural wool fibers to uppers for shoes.

In accordance with one aspect of the present invention, the above and other objects can be accomplished by the provision of a shoe including a sole and an upper, wherein the upper includes an inner upper and an outer upper, wherein the inner upper includes 90% or more of a wool fiber and the outer upper includes a combination of 50 to 80% by weight of the wool fiber and 20 to 50% by weight of a synthetic fiber, based on the total weight of the outer upper.

Preferably, the inner upper may include 90% by weight or more of the wool fiber and the balance of the natural fiber. More preferably, the inner upper may exclusively include the wool fiber. The lowest limit of the amount of the wool fiber present in the inner upper may be 90% by weight, based on the total weight of the inner upper. The reason for this is that, when the amount is less than the lowest limit, the wool fiber cannot exert inherent material properties thereof.

The wool fiber is known to be a fiber having the highest water absorbability (water absorbability: 14-16%) due to presence of more hydrophilic groups and more non-crystalline parts in itself and thus absorbs up to 30% of its own weight in water. In addition, when wool absorbs moisture, it repels water owing to water repellency originated from the hydrophobic scale layer present on the surface thereof. As a result, although much moisture is absorbed, it offers less wet sensation and thus freshness and wave-shaped natural crimp imparts air permeability and elasticity to wool fabrics.

The present inventors recognized material properties of natural wool as described above and predicted to solve the problems by applying the same to shoes. As a result of long-term research based on these points, the present inventors designed shoes having the configuration as described above.

Accordingly, when wool is applied to the upper of the shoe, sweat generated in the foot can be easily discharged outside, comfort is imparted to the foot and irritation is minimized when wearing due to properties of soft wool material.

When the entirety of the upper is made of a wool fiber, durability required for processing cannot be secured in a daily life or upon washing. In terms of this point, the upper includes the inner upper and the outer upper, the inner upper directly contacting the foot includes a wool fiber in an amount of 90% or more, preferably 95% by weight, or most preferably 100% by weight, so as to have the natural wool sufficiently exert inherent properties thereof, and the outer upper includes a combination of a wool fiber and a synthetic fiber so as to secure minimum durability. The synthetic fiber used for the outer upper is used in an amount of 20 to 50% by weight, based on the total weight of the outer upper. This limitation of the number is determined in consideration of functionalities (bulkiness, wear sensation, light weight and the like) of shoes which are influenced by durability of the outer upper.

The synthetic fiber used in combination for manufacturing the outer upper may be any artificial fiber filament such as polyester, nylon, polypropylene or acetate. In order to prevent pilling on the surface of the fabric including wool fibers, the outer upper can be produced by intermingling two kinds of yarns, for example, polyester and nylon with a wool fiber yarn. The number of intermingling is preferably 20 to 100/m. The synthetic fiber filament used can be any one of DTY, FDY, SDY, POY or the like.

Preferably, the wool fiber yarn is Nm 1/20's to 1/60's (=Ne 11.8 to 35.4's=150 to 455 denier) and the polyester and nylon filaments are 30 to 150 denier. This limitation of yarn count is determined in consideration of functionalities (bulkiness, wear sensation, light weight and the like) of shoes.

Here, the outer upper is a knit single jersey weave and inside and outside layers of the weave are terry so that one side (part contacting the foot surface) is denser than another side. As a result, it is possible to facilitate discharge of sweat generated at the foot surface through the inner upper.

In addition, the present invention can facilitate discharge of sweat generated at the foot surface through the inner upper by making the weave density of the inner upper higher than the mean weave density of the outer upper.

Here, the upper may have a structure in which the inner upper and the outer upper are bonded together through a seam. In order to maximize objects and effects of the present invention, the seam formed in the upper is preferably minimized.

Alternatively, the upper may have a structure in which the inner upper and the outer upper are bonded together through a thermosetting hot-melt film with fine pores.

Alternatively, the hot-melt film may be a thermosetting polyurethane hot-melt film, have a structure of adhesive layer/water-permeable layer/adhesive layer and include 0.1 to 50 μm fine pores.

Alternatively, an adhesive solid powder is applied between the inner upper and the outer upper, and the inner upper and the outer upper may be bonded together by melting of the adhesive solid powder. The adhesive solid powder, which has a predetermined volume, is applied so as not to cover the entire surface of the fabric, forms an adhesion point in the inner upper and the outer upper when melted by heat applied in the subsequent process, allows a part where the adhesion point is not formed to define a fine area which allows an air permeable layer or an air layer to be formed and thereby imparts a sense of visible bulkiness.

In another aspect of the present invention, provided is a method of manufacturing uppers for shoes by a consecutive process.

In one embodiment, the method according to present invention is a method of manufacturing an upper for shoes including an inner upper and an outer upper bonded together includes: preparing the inner upper including 90% or more of a wool fiber; preparing the outer upper including a combination of 50 to 80% by weight of the wool fiber and 20 to 50% by weight of a synthetic fiber, based on the total weight of the outer upper; interposing a hot-melt film between the inner upper and the outer upper and hot-pressing the inner upper and the outer upper while allowing the inner upper and the outer upper to pass through a roller; and cooling the hot-pressed upper.

In another embodiment, the method according to present invention is a method of manufacturing an upper for shoes including an inner upper and an outer upper bonded together includes: preparing the inner upper including 90% or more of a wool fiber; preparing the outer upper including a combination of 50 to 80% by weight of the wool fiber and 20 to 50% by weight of a synthetic fiber, based on the total weight of the outer upper; applying an adhesive solid powder between the inner upper and the outer upper and hot-pressing the inner upper and the outer upper while allowing the inner upper and the outer upper to pass through a roller; and cooling the hot-pressed upper.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the configuration of the present invention will be described in detail with reference to the accompanying drawings, in order to allow those skilled in the art to easily understand and implement the present invention.

Figure 1:
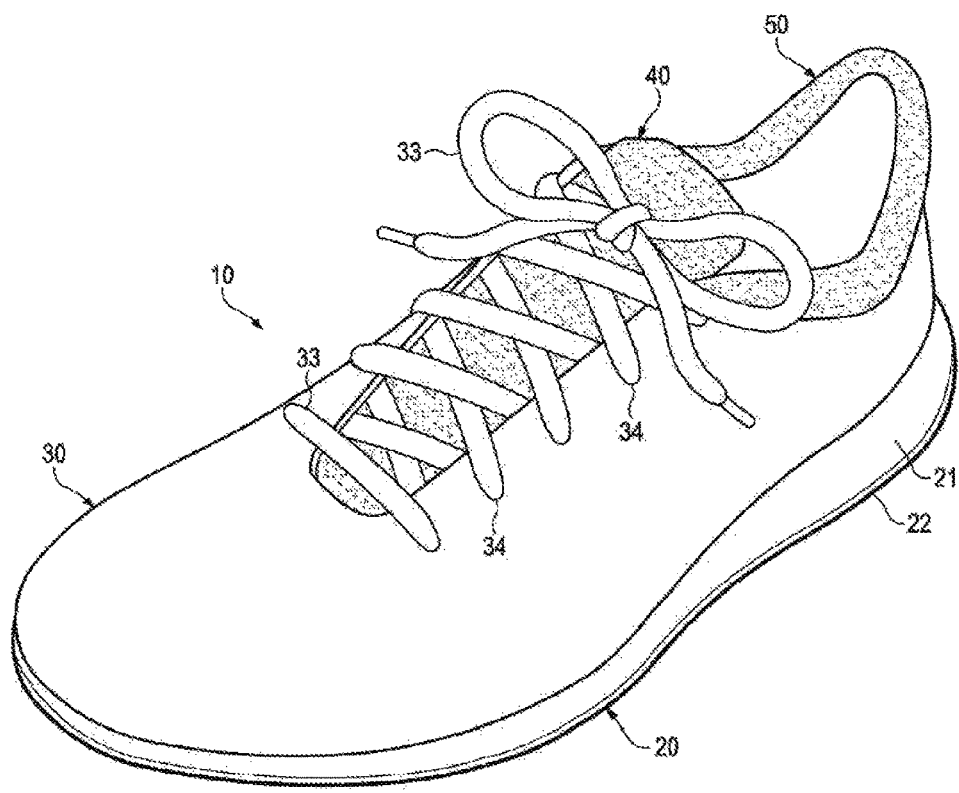
FIG. 1 is a perspective view illustrating an entire configuration of a shoe according to an embodiment of the present invention.

FIG. 1 is a perspective view illustrating a shoe according to an embodiment of the present invention. The shoe 10 of the present invention includes a sole structure 20, an upper 30, a tongue element 40, a collar element 50, and a lace 33. In some cases, the collar element 50 and the lace 33 may be omitted.

The sole structure 20 is secured to the upper 30 and extends between the foot and the ground when a footwear 10 is worn. The primary elements of the sole structure 20 are a midsole 21, an outsole 22, and a sock liner (not shown). The midsole 21 is secured to a lower area of the upper 30 and may be formed from a compressible polymer foam member (e.g., a polyurethane or ethylvinylacetate foam) that attenuates ground reaction forces (i.e., provides cushioning) when compressed between the foot and the ground during walking, running, or other ambulatory activities. In additional configurations, the midsole 21 may incorporate fluid-filled chambers, plates, moderators, or other elements that further attenuate forces, enhance stability, or influence motion of the foot, or the midsole 21 may be primarily formed from a fluid-filled chamber. The outsole 22 is secured to a lower surface of the midsole 21 and may be formed from a wear-resistant rubber material that is textured to impart traction. The sock liner (not shown) is located within the upper 30 and is positioned to extend under a lower surface of the foot. Although this configuration for the sole structure 20 provides an example of a sole structure that may be used in connection with the upper 30, a variety of other conventional or nonconventional configurations for the sole structure 20 may also be utilized. Accordingly, the configuration and features of the sole structure 20 or any sole structure utilized with the upper 30 may vary considerably.

The upper 30 is formed from various elements that combine to provide a structure for securely and comfortably receiving a foot. Although the configuration of the upper 30 may vary significantly, the various elements generally define a void within footwear 10 for receiving and securing the foot relative to the sole structure 20. Surfaces of the void within the upper 30 are shaped to accommodate the foot and extend over the instep and toe areas of the foot, along the medial and lateral sides of the foot, under the foot, and around the heel area of the foot. The upper 30 includes an inner upper and an outer upper, the details of which will be described later.

The lace 33 extends through various lace apertures 34 and across a throat area of the upper 30 to permit the wearer to modify dimensions of the upper 30 and accommodate the proportions of the foot. That is, the lace 33 operates in a generally conventional manner to tighten the upper 30 around the foot (i.e., when the lace 33 is tied) and loosen the upper 30 (i.e., when the lace 33 is untied).

The tongue element 40 extends under the lace 33 to enhance comfort and adjustability of the footwear 10. The upper 30 also includes the collar element 50 that is located in at least a heel region 13. In addition to enhancing the comfort of the footwear 10, the collar element 50 forms an ankle opening for providing the foot with access to the void within upper 30. That is, the ankle opening defined by the collar element 50 facilitates entry and removal of the foot from the void, particularly when the lace 33 is untied to impart a loose-fitting configuration to the upper 30 around the foot.

In the suggested embodiment, the shoe including the tongue element 40 and the collar element 50 is shown, but the elements as well as the lace 33 may be partially or entirely omitted. That is, the collar element 50 may be replaced by an extending end of the upper 30 and the tongue element 40 may be replaced by a part of the upper 30.

Production of Fabric for Upper 30

An outer upper and an inner upper were produced by knitting the yarns described below.

(1) Preparation of Yarn

A dyed 1/48'S wool spun yarn was prepared. The fineness is 48/1.693 (=28.4's) on a cotton count basis, which corresponds to 187.3 denier.

As synthetic fiber filaments, polyester DTY 50/36 and nylon DTY 50/36 were prepared.

A 288-denier blended yarn was produced from the prepared yarns, that is, wool yarn 1/48'S and each one of polyester 50/36 and nylon 50/36 yarns using an intermingling machine. In order to solve the drawback of wool, pilling, polyester and nylon were intermingled with wool at 40/1 m.

(2) Knitting

① Outer Upper

The 288-denier blended yarn including wool yarn 1/48'S and each one of polyester 50/36 and nylon 50/36 yarns was knitted into terry (Mini Zurry) using a 26" 28-gauge single knitting machine (knit single jersey). The fabric was terry (Mini Zurry) which includes different textures of inner and outer layers on the surface to improve air permeability and water absorbability. This aims to facilitate movement of sweat from the instep and thus enhance comfort by making one side directly contacting the instep dense while making the other side sparse.

The wool fiber used for the outer upper was 72.4% by weight and the blended yarn was 27.6% by weight, the balance, with respect to the total weight of the outer upper.

② Inner Upper

100% by weight of the prepared 1/48'S wool yarn was knitted using a 30" 22-gauge double knitting machine (knit jersey). 100% wool was equally used for opposite sides so as to improve elasticity of a part directly contacting the skin and knitting was conducted to produce a PUNTO fabric in order to reinforce abrasion resistance.

PUNTO (ponte di roma stitch) is a derivative weave which is made by using an elastic double-sided stitch as a base and applying welt, which is regarded as a combination of double-sided weave and tubular knit. The combination of two weaves provides density and shape-stability and the circular area of the tubular knit imparts excellent elasticity to fabrics.

According to the present invention, the inner upper was knitted in the form of a ponte fabric so that the upper can be easily changed according to the shape of the foot in consideration of shape change or pain of the foot and wearers can thus feel more comfortable. The elasticity of punto fabric of the inner upper enables the inner upper to be changed according to the shape of the feet and maintains the natural shape of shoes without strain and irritation.

(3) Fabric Processing

① Shrink Proofing

Shrink proofing aims to prevent a woven fabric from shrinking by pre-shrinking fibers. It functions to stabilize the shape and dimensions of shoes and to prevent shrink upon washing, drying or exposure to heat.

Felting, which is a shrink phenomenon of the wool fiber used as a main material for the present invention, is caused by one-direction friction resulting from scale structure and elasticity which is the ability of a material to resume its original shape. Methods of shrink proofing to avoid felting include removing scale of wool or coating it with a resin to prevent felting. The predominant method is to remove scale of wool.

In order to have shoes shrink as strong as possible and thereby secure basic properties of shoes, the mini zurry fabric of the outer upper of the present invention was processed by conducting shrink proofing in an order of fabric spreading, scouring, washing, milling, scouring, dehydrating, slitting opening, tentering and water repellent finishing so that tangling caused by shrinkage and moisture can be minimized (conducted for both inner and outer uppers). Furthermore, in order to improve functions such as air permeability, dryness and warmness, milling is further conducted (only for outer upper).

A predetermined shrinkage degree previously applied to the fabric when conducting shrink proofing on the upper and high elasticity of wool fibers which are chain-type polymers including amino acids extending lengthwise in a chain form synergistically further reinforce elasticity of the upper fabric. The upper having excellent elasticity surrounds the foot according to shape of the wearer's foot and provides comfortable wear sensation.

② Worsted Finishing

For thorough processing of a delicate part of the inner upper which directly contacts the skin, worsted finishing was conducted in the order of raw cloth spreading, scouring, dyeing, dehydrating, slitting opening, worsted processing, shearing, tentering and calendaring so that skin irritation can be reduced, fine hair is removed and water absorbability and freshness can be improved.

(4) Manufacture of Upper 30

The prepared fabrics for the inner upper and outer upper were bonded using an adhesive agent to produce an upper 30.

Test Example 1

In order to test durability of the outer upper produced above, anti-pilling testing was comparatively conducted for 100% wool fabric and cotton knit fabric in accordance with KS K 0499 (pilling test method of woven fabric and knit fabric, and random tumble pilling test method) (three times).

TABLE 1

| Items | Outer upper of the present invention | 100% wool fabric | Cotton fabric |
|---|---|---|---|
| 1 | 4 | 2 | 3 |
| 2 | 4 | 1 | 2 |
| 3 | 4 | 4 | 3 |
| Mean | 4 | 2.3 | 2.7 |

\* Grade Assessment Criteria

| Grade | Assessment | Assessment Criteria |
|---|---|---|
| 5 | Excellent | Excellent resistance (no pilling) |
| 4 | Good | Good resistance (slight pilling) |
| 3 | Medium | Medium resistance (moderate pilling) |
| 2 | Poor | Poor resistance (heavy pilling) |
| 1 | Very poor | Very poor resistance (very severe pilling) |

Text Example 2

In order to test shrinkage of the upper produced above, a 30 cm length fabric was prepared and the length shrunken after washing three times was measured and results are shown in the following Table 2.

TABLE 2

| Number of washes | Length after washing (cm) | Shrinkage (%) |
|---|---|---|
| 1 | 29.5 | 1.67 |
| 2 | 29.3 | 2.33 |
| 3 | 29.2 | 2.67 |

Manufacture of Shoe 10

Figure 2:
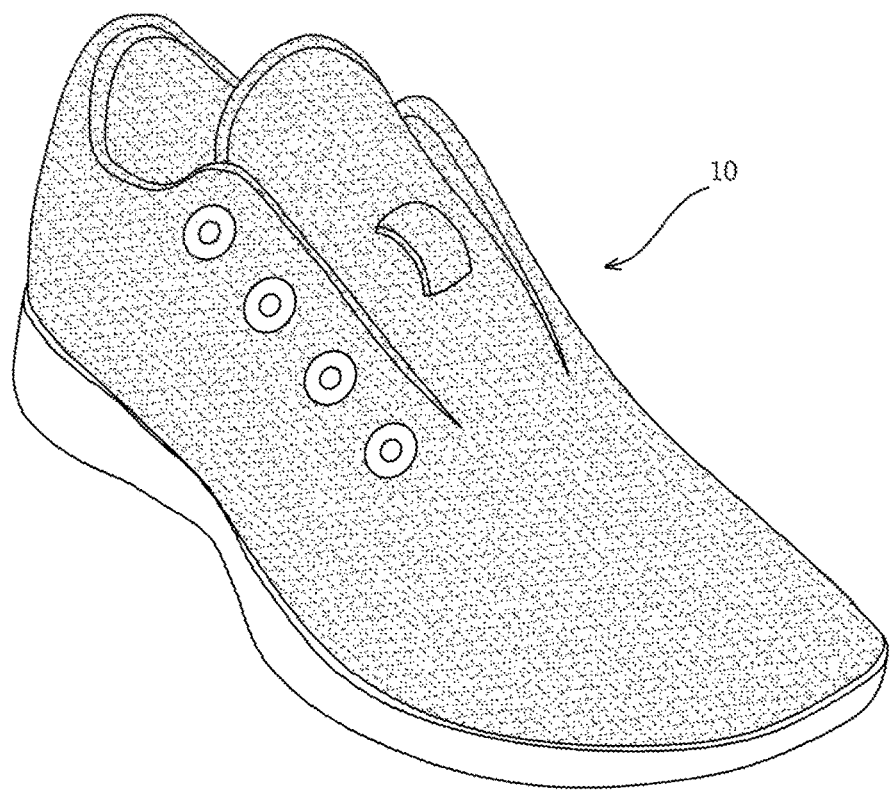
FIG. 2 is an image showing a shoe manufactured according to an embodiment of the present invention.

A shoe as shown in FIG. 2 was manufactured using the produced upper fabric.

Manufacture of Upper 30 by Consecutive Bonding Process

Figure 3:
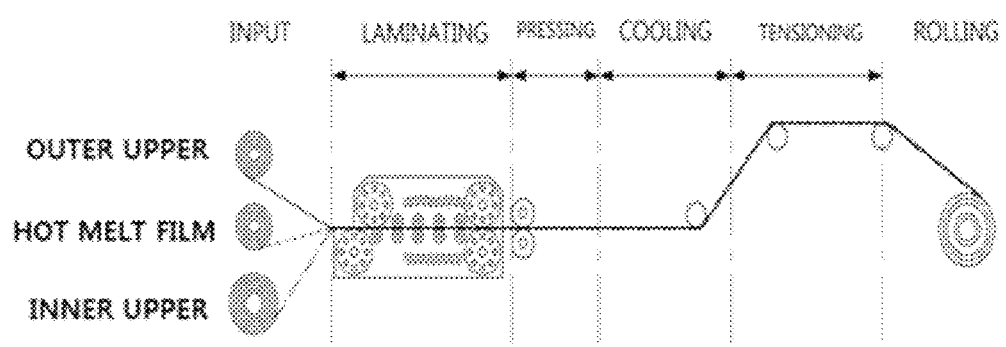
FIG. 3 is a flowchart illustrating a method of consecutively manufacturing an upper for shoes according to the present invention.

The upper was continuously produced in accordance with the process schematically shown in FIG. 3 (input rack→laminating→press rolling→cooling→passing through tension bar→rolling system). An available hot-melt is a thermosetting resin such as polyamide hot-melt, polyurethane hot-melt, polyolefin hot-melt, E.V.A (ethylene vinyl acetate) hot melt or the like. The hot-melt film includes the thermosetting resin mentioned above as a base and further includes a wax to secure viscosity when melted, an adhesion-imparting resin, a filler, an antioxidant and the like. The film may be a single layer or multiple layers. For example, a film including three layers of the multiporous layer (moisture permeable layer) and adhesive layers provided at both sides of the multiporous layer is illustrated in the present invention. The multiporous moisture permeable layer may have fine pores with a size of about 0.1 to about 50.0 μm.

Bonding is conducted under conditions of 130 to 140° C., rate of 5 to 30 cm/sec and pressing pressure of 4 to 5 kg/cm$^2$.

Text Example 3

After three diabetic patients stricken with complications on the foot wore the shoes according to the present invention for five days, wear sensation of the shoes according to the present invention and the shoes (running shoes) they had worn before was comparatively evaluated. Results are shown in Table 3.

TABLE 3

|  | Shoes of the present invention | Running shoes |
|---|---|---|
| Softness | Excellent | Moderate |
| Pain caused by friction | No | Yes |
| Wound level | No | Yes |
| Fatigue degree of foot after wearing shoes for 8 hours or longer | Excellent | Severe |

The shoes made of synthetic fibers increase friction with the foot and readily cause wounds on the foot. On the other hand, since the shoes according to the present invention are made of wool which is a soft and elastic fiber, they are suitable for diabetic patients who should be careful of foot injury, as can be seen from the test results above. That is, the shoes according to the present invention include the inner upper which directly contacts the foot made of 90% by weight or more of wool or 100% by weight of a natural fabric, thereby minimizing friction with the foot and secondary damage such as infection which may be caused by foot injury. In addition, owing to elasticity of the fabric having a structure in which the inner upper and the outer upper are bonded together, natural wear sensation according to the shape and movement of feet can be obtained.

The shoes according to the present invention can facilitate discharge of sweat generated during exercise through the upper made of natural wool fiber and thus offer fresh wear sensation and can be worn without socks.

In addition, elasticity of wool fabric can reduce resistance of shoes depending on shape change of feet during exercise or in a daily life, thus imparting foot comfort. As a result, people whose feet swell readily, such as pregnant women, can wear the shoes without irritation.

In addition, the shoes according to the present invention are suitable for diabetic patients whose feet need to be protected from injury because they are made of wool which is a soft elastic fiber.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shoe comprising a sole and an upper,
   wherein the upper comprises an inner upper and an outer upper,
   wherein the inner upper comprises 90% or more of a wool fiber and the outer upper comprises a combination of 50 to 80% by weight of the wool fiber and 20 to 50% by weight of a synthetic fiber, based on the total weight of the outer upper.

2. The shoe according to claim 1, wherein the upper is shrink-proofed.

3. The shoe according to claim 1, wherein the inner upper and the outer upper are bonded together through a seam.

4. The shoe according to claim 1, wherein the inner upper and the outer upper are bonded together through a hot-melt film.

5. The shoe according to claim 4, wherein the hot-melt film has water permeability.

6. The shoe according to claim 4, wherein the hot-melt film is a thermosetting polyurethane hot-melt film and has a configuration of adhesive layer/water-permeable layer/adhesive layer, and the water-permeable layer has fine pores with a size of 0.1 to 50.0 μm.

7. The shoe according to claim 1, wherein the outer upper is formed by knitting blended yarns which are obtained by intermingling wool fiber yarns with polyester and nylon filaments.

8. The shoe according to claim 7, wherein the wool fiber yarns are Nm 1/20's to 1/60's and the polyester and nylon filaments are 30 to 150 denier.

9. The shoe according to claim 1, wherein the outer upper is a knit single jersey weave, and inner and outer layers of the weave are terry so that a surface is denser than a bottom.

10. The shoe according to claim 1, wherein a weave density of the inner upper is higher than a mean weave density of the outer upper.

11. The shoe according to claim 1, wherein the inner upper is a PUNTO (ponte di roma stitch) weave.

12. The shoe according to claim 1, wherein an adhesive solid powder is applied between the inner upper and the outer upper, and the inner upper and the outer upper are bonded together by melting.

13. The shoe according to claim 1, wherein the inner upper and the outer upper are bonded together through an adhesive agent.

14. A method of manufacturing an upper for shoes comprising an inner upper and an outer upper bonded together, the method comprising:
  preparing the inner upper comprising 90% or more of a wool fiber;
  preparing the outer upper comprising a combination of 50 to 80% by weight of the wool fiber and 20 to 50% by weight of a synthetic fiber, based on the total weight of the outer upper;
  interposing a hot-melt film between the inner upper and the outer upper and hot-pressing the inner upper and the outer upper, while allowing the inner upper and the outer upper to pass through a roller; and
  cooling the hot-pressed upper.

15. A method of manufacturing an upper for shoes comprising an inner upper and an outer upper bonded together, the method comprising:
  preparing the inner upper including 90% or more of a wool fiber;
  preparing the outer upper including a combination of 50 to 80% by weight of the wool fiber and 20 to 50% by weight of a synthetic fiber, based on the total weight of the outer upper;
  applying an adhesive solid powder between the inner upper and the outer upper and hot-pressing the inner upper and the outer upper while allowing the inner upper and the outer upper to pass through a roller; and
  cooling the hot-pressed upper.

* * * * *